(12) United States Patent
Savruha et al.

(10) Patent No.: US 10,434,820 B1
(45) Date of Patent: Oct. 8, 2019

(54) CASTER SYSTEM FOR MOVING FURNITURE

(71) Applicants: Vitalii Savruha, Dnepr (UA); Volodimir I. Vavrenyuk, Kamianske (UA)

(72) Inventors: Vitalii Savruha, Dnepr (UA); Volodimir I. Vavrenyuk, Kamianske (UA)

( * ) Notice: Subject to any disclaimer, the term of this patent is extended or adjusted under 35 U.S.C. 154(b) by 0 days.

(21) Appl. No.: 16/384,377

(22) Filed: Apr. 15, 2019

Related U.S. Application Data

(60) Provisional application No. 62/662,090, filed on Apr. 24, 2018.

(51) Int. Cl.
*B60B 33/00* (2006.01)

(52) U.S. Cl.
CPC ...... *B60B 33/0028* (2013.01); *B60B 33/0002* (2013.01); *B60B 33/0039* (2013.01); *B60B 33/0049* (2013.01); *B60B 33/0057* (2013.01); *B60B 33/0068* (2013.01); *B60B 33/0073* (2013.01); *B60B 33/0081* (2013.01);
(Continued)

(58) Field of Classification Search
CPC . Y10T 16/184; Y10T 16/212; Y10T 16/1857; Y10T 16/186; Y10T 16/1867; Y10T 16/196; B60B 33/002; B60B 33/00; B60B 33/0028; B60B 33/0039; B60B 33/0047; B60B 33/0057; B60B 33/045; B60B 33/0063; B60B 9/06; B60B 9/005; B60B 2900/1331; B60B 33/0002; B60B 33/0049; B60B 33/0068; B60B 33/0073; B60B 33/0081; B60B 2200/20; B60B 2360/00; B60B 2380/12; B60B 2900/571; B60B 2900/572; B60G 11/00; B60G 11/14; B60G 11/15; B60G 11/16; B60G 11/006; B60G 3/01; A45C 5/14; A45C 2005/148
See application file for complete search history.

(56) References Cited

U.S. PATENT DOCUMENTS

| | | | |
|---|---|---|---|
| 2,034,509 A | 3/1936 | Haven | |
| 4,035,864 A * | 7/1977 | Schroder | B60B 33/021 16/35 R |

(Continued)

FOREIGN PATENT DOCUMENTS

| | | | | |
|---|---|---|---|---|
| JP | 08318715 A | * | 12/1996 | ............ B60C 11/00 |
| JP | 2009096272 A | * | 5/2009 | |

(Continued)

*Primary Examiner* — Chuck Y Mah
(74) *Attorney, Agent, or Firm* — Lawrence G. Fridman, Esq.; Feigin & Fridman, LLC

(57) ABSTRACT

A caster system, including a housing portion, which includes first and second side walls defining an operational space therebetween and an upper wall including a central bore. A rolling assembly is disposed in the operational space, and is rotatable relative to the housing. The rolling assembly includes an exterior rim formed of a resilient material having at least one coloring agent embedded therein. A vertical connection assembly includes a shaft adapted to be fixed to a furniture article and to extend through the central bore in the upper wall. The housing portion is rotatable about the shaft of the vertical connection assembly. The coloring agent is adapted to be luminescent or phosphorescent in a dark environment.

14 Claims, 6 Drawing Sheets

(52) U.S. Cl.
CPC ....... *B60B 2200/20* (2013.01); *B60B 2360/00* (2013.01); *B60B 2360/50* (2013.01); *B60B 2380/12* (2013.01); *B60B 2900/131* (2013.01); *B60B 2900/571* (2013.01)

(56) References Cited

U.S. PATENT DOCUMENTS

| | | | | |
|---|---|---|---|---|
| 4,072,373 | A * | 2/1978 | Black | ................. B60B 33/0028 384/537 |
| 4,294,491 | A * | 10/1981 | Black | ...................... B60B 3/082 301/105.1 |
| 4,408,803 | A | 10/1983 | Green et al. | |
| 4,633,544 | A * | 1/1987 | Hicks | ................. B60B 33/0028 16/35 R |
| 4,783,880 | A * | 11/1988 | Chapman | ........... B60B 33/0028 16/36 |
| 4,835,815 | A * | 6/1989 | Mellwig | ............ B60B 33/0078 16/35 R |
| 5,053,930 | A | 10/1991 | Benavides | |
| 5,390,393 | A * | 2/1995 | Reppert | ............. B60B 33/0002 16/21 |
| 5,560,685 | A * | 10/1996 | De Bortoli | ........ A63C 17/1454 152/50 |
| 5,593,461 | A * | 1/1997 | Reppert | ............. B60B 33/0002 16/21 |
| 5,718,499 | A | 2/1998 | Do Caro | |
| 6,398,395 | B1 * | 6/2002 | Hyun | ..................... A63C 17/26 362/192 |
| 6,786,559 | B1 * | 9/2004 | Kidd | .................... A63C 17/223 301/5.23 |
| 7,698,780 | B2 * | 4/2010 | Yan | .................... B60B 33/0021 16/18 CG |
| 7,891,051 | B2 * | 2/2011 | Chou | ........................ B60B 7/02 16/20 |
| 7,926,145 | B2 * | 4/2011 | Liao | ................... B60B 33/0018 16/18 R |
| 8,079,606 | B2 * | 12/2011 | Dull | ................... B60B 33/0005 16/35 R |
| 8,312,595 | B2 | 11/2012 | Trivini | |
| 8,424,158 | B2 * | 4/2013 | Steenson | ............ B60B 33/0018 16/35 R |
| 8,561,258 | B2 | 10/2013 | Breyer et al. | |
| 2004/0201188 | A1 * | 10/2004 | Sadow | ................... B60B 37/10 280/47.26 |
| 2006/0042836 | A1 | 3/2006 | Peters et al. | |
| 2007/0283523 | A1 * | 12/2007 | Ruckman | ............. B60B 33/001 16/20 |

FOREIGN PATENT DOCUMENTS

| | | | | |
|---|---|---|---|---|
| JP | | 2012056549 A | * | 3/2012 |
| WO | WO-2007049886 A1 | * | 5/2007 | ............ B60C 11/00 |

* cited by examiner

CASTER SYSTEM FOR MOVING FURNITURE

CROSS-REFERENCE TO RELATED APPLICATION

The present application claims priority of Provisional Patent Application Ser. No. 62/662,090 filed on Apr. 24, 2018, the entire disclosure of which is hereby incorporated by reference.

FIELD AND BACKGROUND OF THE INVENTION

The disclosed technology relates generally to mechanisms for moving furniture pieces, and more specifically to a caster for moving pieces of furniture which caster is visible in a dark environment.

U.S. Pat. No. 5,718,499 to De Caro is directed to a roller blade wheel lighting system for increasing the visibility of the user when roller blading in the darkness, without requiring an external power source. The device of De Caro includes a transparent cylindrical plastic rim rotatably secured to a conventional blade support member of a roller blade, an illuminating means positioned within the transparent cylindrical plastic rim. A hard rubber rim secured around the transparent cylindrical rubber rim. Specifically, the illuminating means comprise LEDs disposed within the transparent rubber rim.

U.S. Pat. No. 5,053,930 to Benavides is directed to a phosphorescent vehicle part identification accessory, which comprises an article or molded plastic having formed therewith a phosphorescent compound adapted for glowing for a period following exposure to light energy. The phosphorescent article is secured to the vehicle in a location thereon for receiving illumination from other vehicles and external light sources and providing a decaying glow therefrom. The phosphorescent article may comprise a vehicle wheel valve stem cap, a strip, or a tab adapted for positioning about a vehicle keyhole.

U.S. Patent Application Publication No. 2006/0042886 to Peters et al is directed to a mechanism having a brake motor adapted to connect to a vehicle and a brake caliper having a brake pad. The brake caliper clamps the brake pad against the brake rotor to slow the vehicle. The clamping causes heating of the brake rotor and a hydrocarbon release. The mechanism also includes a glowing member connected to an outboard face of the brake rotor such that heating causes glowing of the glowing member. The glowing member provides a visually pleasing aesthetic appearance from the brake rotor visible to a bystander.

U.S. Pat. No. 6,375,864 to Phillips et al is directed to compositions and molded, extruded or formed phosphorescent plastic articles produced therefrom that contain non-radioactive, non-sulfide phosphorescent phosphor pigments that emit light in the visible spectrum. The plastic articles produced from such compositions exhibit attractive and clear fluorescent daylight color and strong, long-lasting glow-in-the-dark luminescence having a color similar to that of the daylight color.

However, none of the prior art arrangements provide for a caster for moving furniture, which caster is visible in a dark environment and enables smooth movement of heavy furniture articles.

SUMMARY OF THE INVENTION

The invention relates generally to mechanisms for moving furniture pieces, and more specifically to a caster for moving pieces of furniture which caster is visible in a dark environment. More specifically, the invention provides a caster having increased visibility when rolled/moved in a dark environment, without requiring an external power source. The caster of the invention not only provides a smooth motion of the furniture article, but also facilitates shock absorption while moving the furniture article over an uneven surface or over obstacles.

In the context of the present application, the term "furniture article" relates to any heavy article designed to be placed in a room, including, but not limited to, tables, work surfaces, electrical appliances, sofas, closets, cabinets, chairs including office chairs, beds and gurneys, medical equipment, musical instruments, and the like.

In the context of the present application, the term "caster" includes any type of support structure for a furniture article which enables the furniture article to be rollingly displaced or moved on a support surface. Thus, a caster includes a device having at least one wheel, roller, or the like.

Accordingly, one goal of the present invention is to provide a caster system which overcomes drawbacks of the prior art, by providing a caster system which is visible in a dark environment without requiring an external power source, while facilitating smooth movement of the furniture article moved by the caster, and shock absorption enabling movement of the furniture article over uneven ground and over obstacles.

There is thus provided, in accordance with an embodiment of the disclosed technology, a caster system, including a housing portion, which includes first and second side walls defining an operational space therebetween and an upper wall including a central bore. A rolling assembly is disposed in the operational space and is rotatable relative to the first and second side walls. The roll assembly includes a hub, a rigid interior disk surrounding the hub, and an exterior rim formed of a resilient material having at least one coloring agent embedded therein. A vertical connection assembly includes a shaft adapted to be fixed to a furniture article and to extend through the central bore in the upper wall. The housing portion is rotatable about the shaft of the vertical connection assembly, and the coloring agent is adapted to be luminescent or phosphorescent in a dark environment.

In some embodiments, the first and second side walls of the housing portion each includes a side extension having a side extension bore formed therein, and the housing portion further includes a first extension extending from the upper wall between the side extensions, the first extension being substantially flush with the upper wall.

In some embodiments, the caster system further includes a brake assembly including a brake plate and a brake pedal. The brake plate has a first end and a second end, the first end being fixedly attached to the first extension and the second end being disposed adjacent the rolling assembly. The brake pedal is disposed above the brake plate and is pivotally connected to the side extensions of the housing portion via the extension bores, such that the brake pedal is pivotable, relative to the housing portion, between a first position and a second position. In the first position, the brake pedal engages the brake plate while the brake plate is distant from the rolling assembly, such that the rolling assembly can rotate relative to the housing. In the second position, the brake pedal pushes the brake plate toward the exterior rim, such that the brake plate engages the exterior rim of the rolling assembly and rotation of the rolling assembly relative to the housing is prevented.

In some embodiments, the brake pedal is adapted to be transitioned between the first position and the second position under force applied by the foot of an operator using the caster system.

In some embodiments, the vertical connection assembly further includes first and second bearing disposed about the shaft and engaging respective upper and lower surfaces of the upper wall. In some embodiments, at least one of the first and the second bearings includes ball bearings.

In some embodiments, the resilient exterior rim includes a resin composition including phosphorescent phosphor pigments as the coloring agent, such that exterior rim is adapted to exhibit a color in a lighted environment and to luminesce in the dark environment. In some such embodiments, the luminescence of the exterior rim has a color similar to the color exhibited in the lighted environment.

In some embodiments, the resilient exterior rim further includes at least one fluorescent dye as the coloring agent.

In some embodiments, the coloring agent is adapted to receive illumination from at least one external light source and to provide a decaying glow from the illumination.

In some embodiments, the exterior rim is smooth and is adapted to maintain a supporting surface, on which the rolling assembly is rolled, unharmed.

In some embodiments, the resilient material is selected such that the rolling assembly is adapted to roll over a small obstacle having a height of at most 1 cm without hindrance to movement of the rolling assembly.

In some embodiments, the resilient material is selected so as to absorbs shocks to the rolling assembly during rotation thereof relative to the housing portion.

There is further provided, in accordance with an embodiment of the disclosed technology, a movable furniture article, including a furniture article body and a plurality of caster systems as described herein, the shaft of each of the plurality of caster systems being fixedly attached to the furniture article body. The plurality of caster systems are adapted to enable an operator to move the furniture article, and the exterior rims of the plurality of caster systems are adapted to luminesce or fluoresce when the furniture article is in a dark environment, thus enabling the operator to move the furniture article safely in the dark.

BRIEF DESCRIPTION OF THE DRAWINGS

The foregoing discussion will be understood more readily from the following detailed description of the invention, when taken in conjunction with the accompanying FIGS. (1-10), in which.

DETAILED DESCRIPTION OF THE INVENTION

The disclosed technology relates generally to mechanisms for moving furniture articles by caster systems, and more specifically to caster systems which are visible in a dark environment and facilitate movement of the furniture article over uneven ground or obstacles.

Figure 1A:
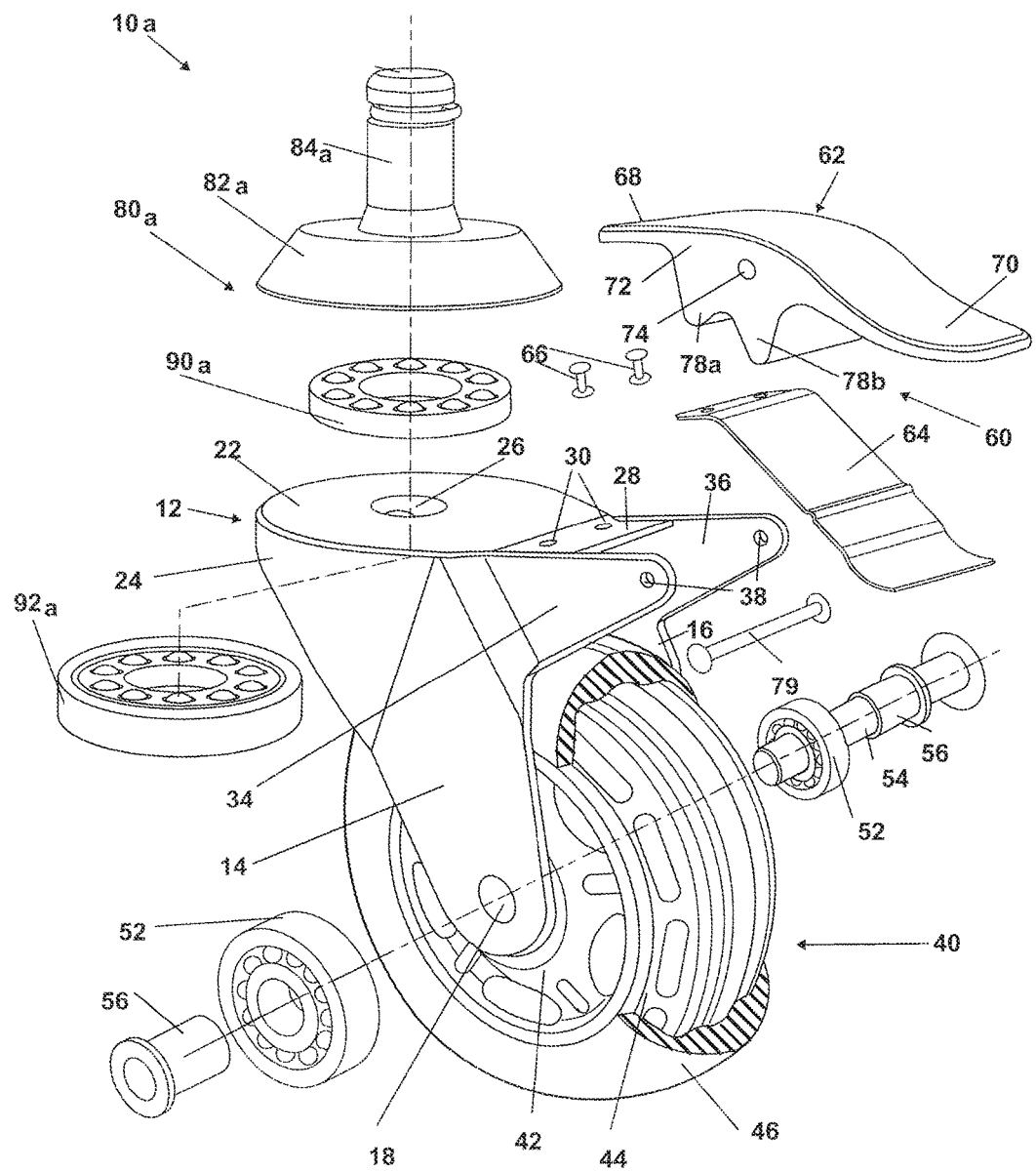
FIGS. 1a and 1b are exploded view illustrations of two versions of a caster system according to a first embodiment of the disclosed technology.
Figure 1B:
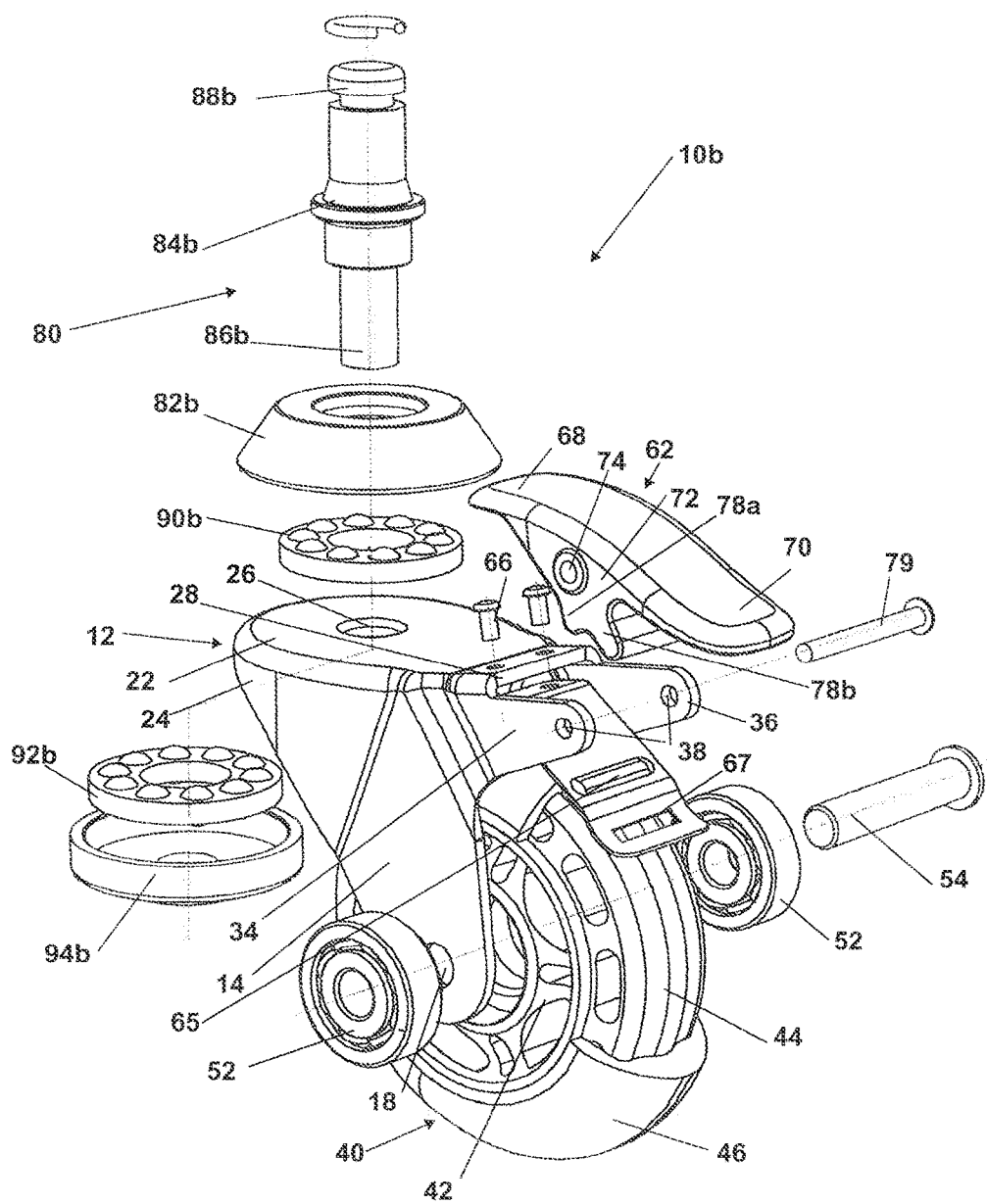
Figure 2:
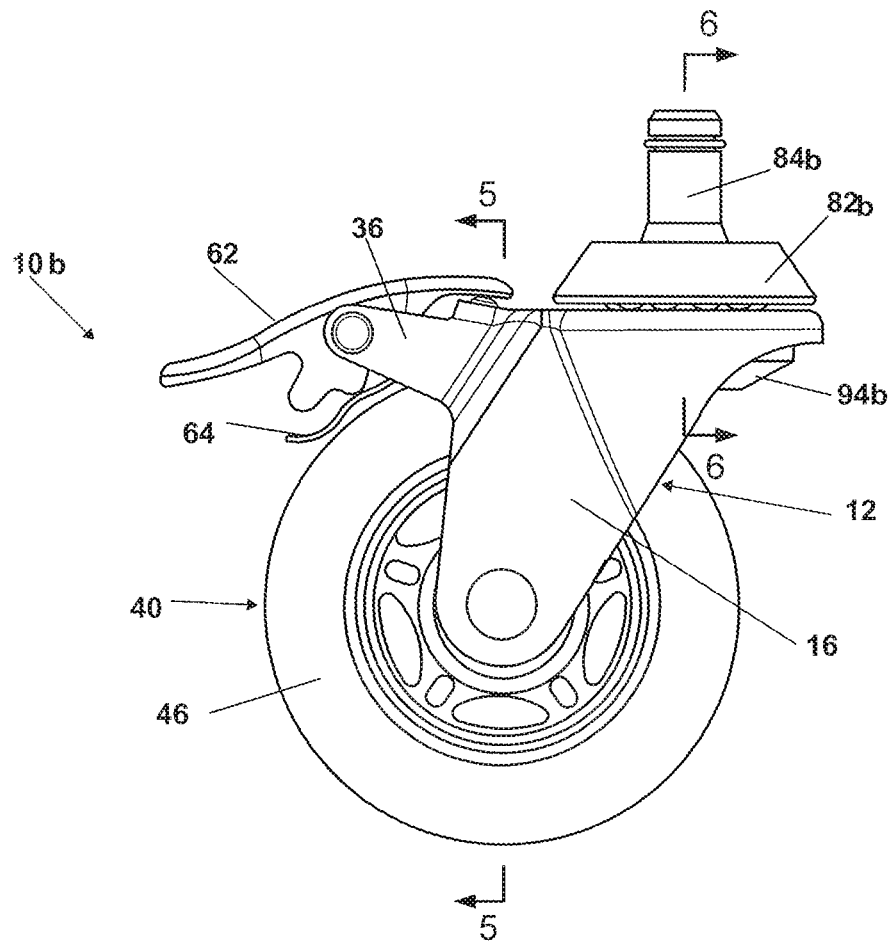
FIG. 2 is a side elevational view illustration of the caster system of FIG. 1, when constructed.
Figure 3:
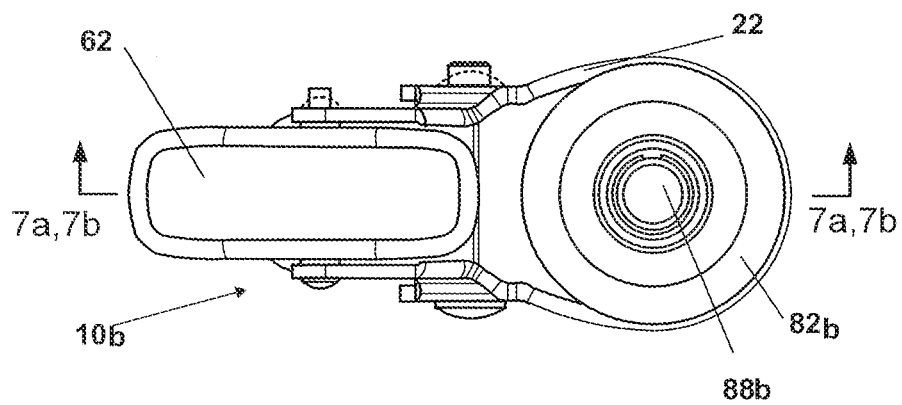
FIG. 3 is a top plan view illustration of the caster system of FIG. 1, when constructed.
Figure 4:
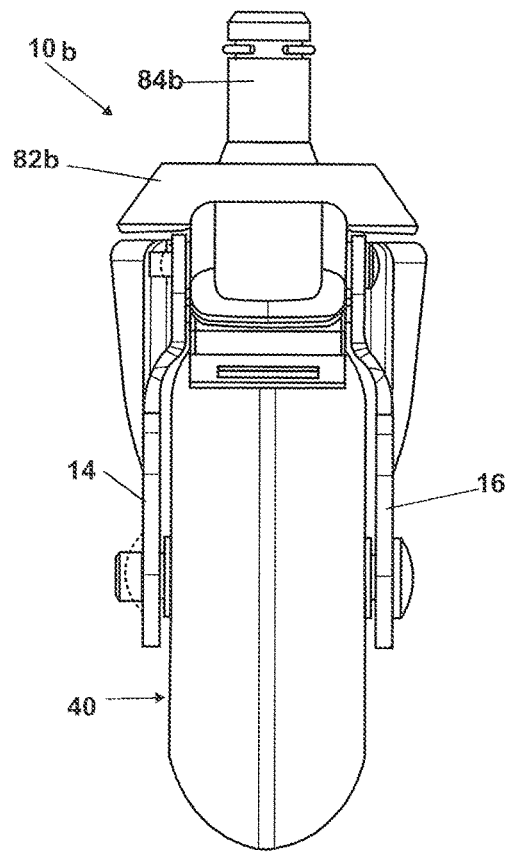
FIG. 4 is a front elevational view illustration of the caster system of FIG. 1, when constructed.

Reference is now made to FIGS. 1a and 1b, which are exploded view illustration of two versions of caster systems 10a and 10b according to a first embodiment of the disclosed technology, to FIGS. 2, 3, and 4, which are, respectively, side, top, and front plan view illustrations of the caster system 10b, and to FIGS. 5, 6, 7a, and 7b, which are sectional illustrations of the caster system 10b.

As seen in FIGS. 1a and 1b, caster systems 10a and 10b according to the disclosed technology includes a housing portion 12 including first and second side walls 14 and 16. The side walls 14 and 16 each include a bore 18, and are separated from each other by an operational space. Housing portion 12 further includes a generally circular upper wall 22, surrounded by a generally circumferential rim wall 24 and including a central through going bore 26.

Upper wall 22 includes an extension 28 having a plurality of bores 30 therein. A pair of side extensions 34 and 36 extend from side walls 14 and 16, such that extension 28 is disposed between side extensions 34 and 36. Each of side extensions 34 and 36 terminates in a bore 38, such that bores 38 are aligned with one another. In some embodiments, an upper edge of side extensions 34 and 36 is flush with upper wall 22.

A rolling assembly 40 is adapted to be connected to housing 12 via bores 18 in side walls 14 and 16. Specifically, the rolling assembly 40 includes a hub 42, and an interior disk 44 surrounding hub 42. Interior disk 44 is typically formed of a hard and/or rigid material, and is surrounded by an exterior rim 46 formed of resilient material.

Figure 5:
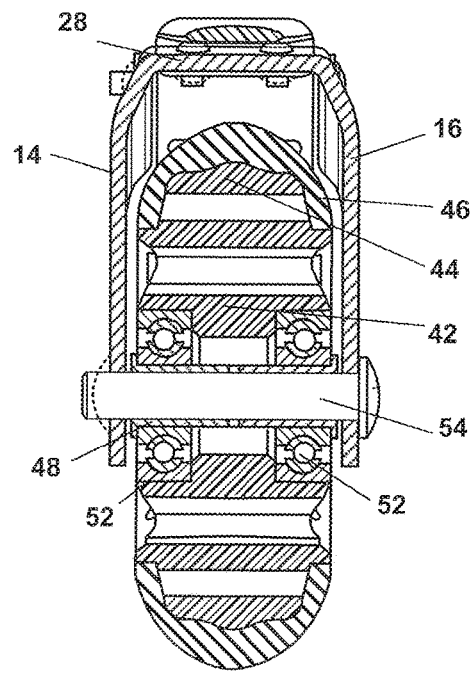
FIG. 5 is a first sectional illustration of the caster system of FIG. 2, the sectional illustration taken along section lines 5-5 in FIG. 2.

As seen clearly in FIG. 5, hub 42 includes a central bore 48, surrounded by two bearing seats 50. Bearings 52 are seated within seats 50 in hub 42, thereby to form part of rolling assembly 40. In some embodiments, the bearings 52 comprise ball bearings.

Rolling assembly 40 is adapted to be disposed within the operational space and to be connected to side walls 14 and 16 of housing 12 by an axle shaft 54 adapted to be threaded through bores 18 of the side walls and bore 48 of hub 42. In caster system 10a of FIG. 1a, the axle shaft being held in place by fasteners 56.

A brake assembly 60, includes a brake pedal 62 adapted to be activated by a foot of an operator, and a brake plate 64, disposed beneath the brake pedal 62. Brake plate 64 is adapted to be fixedly connected to extension 28 of housing 12, for example by connectors 66. In the embodiment of FIG. 1b, brake plate 64 includes a seat 65 for engagement of the brake pedal, and a slot 67.

Brake pedal 62 includes a first end 68 and a second end 70 adapted to be engaged by the foot of the operator. Additionally, brake pedal includes side surfaces 72, each including a bore 74. Brake pedal 62 further includes a first protrusion 78a and a second protrusion 78b extending substantially at the center of the brake pedal, distally to an upper surface thereof.

Figure 7A:
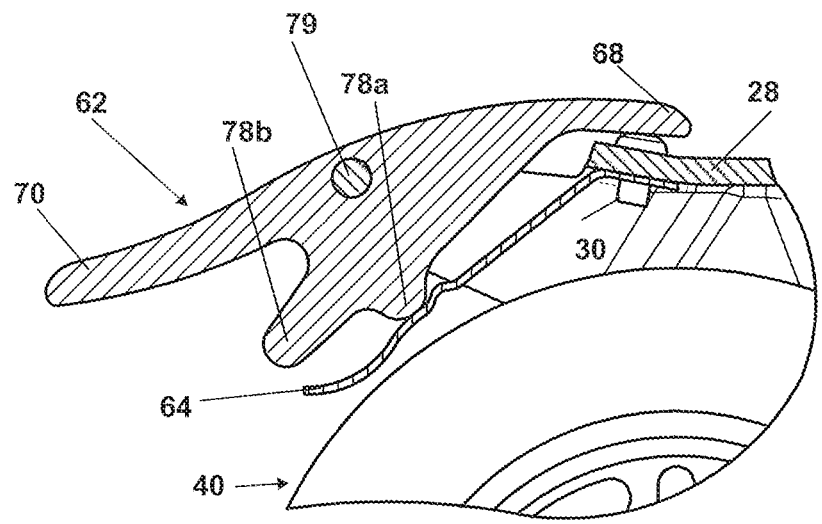
FIGS. 7a and 7b are partial and enlarged sectional illustrations of a brake portion of the caster system of FIG. 3, the sectional illustration taken along section lines 7a,b-7a,b in FIG. 3.
Figure 7B:
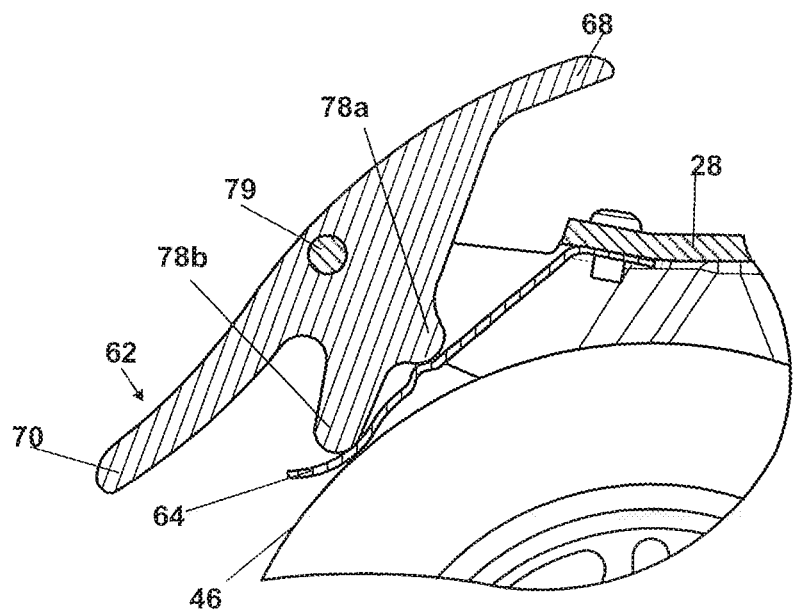

As seen clearly in FIGS. 7a and 7b, brake pedal is adapted to be pivotally connected to side extensions 34 and 36 of housing 12 by an axle 79 extending through bores 38 in side extensions 34 and 36 and bores 74 of brake pedal 62.

In a first, unlocked orientation of the brake pedal 62, illustrated in FIG. 7a, first end 68 of the brake pedal engages extension 28 of the housing and/or connectors 66 connecting the brake plate 64 to the housing. In this operative orientation, first protrusion 78a engages the brake plate 64, but does not apply pressure thereto, and second protrusion 78b is distant from brake plate 64, such that the brake plate does not engage the rolling assembly 40 and the caster system is movable by rolling the rolling assembly 40.

In a second, locked operative orientation of the brake pedal 62, illustrated in FIG. 7b, the brake pedal is rotated relative to side extensions 34/36, such that first end 68 of the brake pedal is distant from extension 28 and/or connectors 66. The rotation of the brake pedal causes protrusion 78b to engage the brake plate 64 and to push the brake plate downward to engage resilient exterior rim 46. Engagement between the brake plate 64 and the exterior rim 46 prevents rotation of the rolling assembly 40 relative to axle shaft 54, and as such prevents rolling of the caster system 10.

The operator may transition the brake pedal 62 from the unlocked operative orientation to the locked operative orientation by pushing downward on second end 70 of the brake pedal, for example using his/her foot. Conversely, the operator may transition the brake pedal 62 from the locked operative orientation to the unlocked operative orientation by raising second end 70 of the brake pedal relative to the rolling assembly 40.

Caster systems 10a and 10b further includes respective vertical connection assemblies 80a and 80b.

Vertical connection assembly 80a of FIG. 1a includes a base portion 82a, fixedly attached to a connection shaft 84a. Vertical connection assembly 80a is adapted to be connected to housing 12 by insertion of a lower end of connection shaft 84a into central bore 26 of upper wall 22. An upper bearing 90a is adapted to be disposed within base portion 82a of vertical connection assembly 80a, and to engage an upper surface of upper wall 22. A lower bearing 92a is adapted to be disposed about the lower end of the connection shaft and to engage a lower surface of upper wall 22. An upper end of connection shaft 84a is adapted to be fixedly anchored to a furniture article, for example to a lower surface thereof.

Connection shaft 84a and bearings 90a and 92a facilitate rotation of the housing 12, together with brake assembly 60 and rolling assembly 40, relative to the furniture article.

Figure 6:
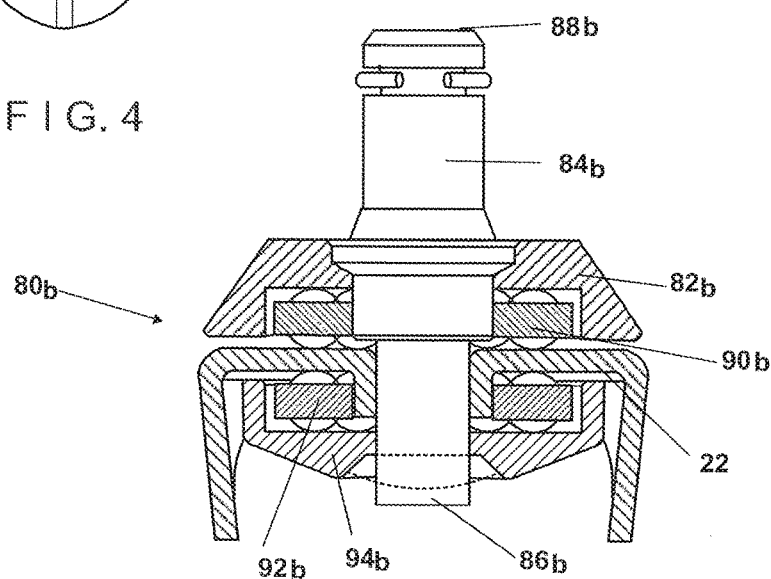
FIG. 6 is second a sectional illustration of the caster system of FIG. 2, the sectional illustration taken along section lines 6-6 in FIG. 2.

Vertical connection assembly 80b of FIG. 1b, also illustrated in cross section in FIG. 6, includes a base portion 82b and a connection shaft 84b having a lower end 86b and an upper end 88b. Vertical connection assembly 80b is adapted, to be connected to housing 12 by insertion of lower end 86b of connection shaft 84b into central bore 26 of upper wall 22, as shown clearly in FIG. 6. An upper bearing 90b is adapted to be disposed within base portion 82b of vertical connection assembly 80b, and to engage an upper surface of upper wall 22. A lower bearing 92b is adapted to be disposed about lower end 86b of the connection shaft and to engage a lower surface of upper wall 22. Lower bearing 92b may be held in place by a lower anchoring portion 94b, shown clearly in FIG. 6. Upper end 88b of connection shaft 84b is adapted to be fixedly anchored to a furniture article, for example to a lower surface thereof.

Connection shaft 84b and bearings 90b and 92b facilitate rotation of the housing 12, together with brake assembly 60 and rolling assembly 40, relative to the furniture article.

In use, when brake pedal 62 is in the locked operative orientation, the caster system 10 allows a furniture article attached thereto to be fixed in a desired or predetermined position or location. Conversely, when brake pedal 62 is in the unlocked operative orientation, the caster system 10 allows the furniture article attached thereto to be moved from one location to another.

Figures 8, 9:
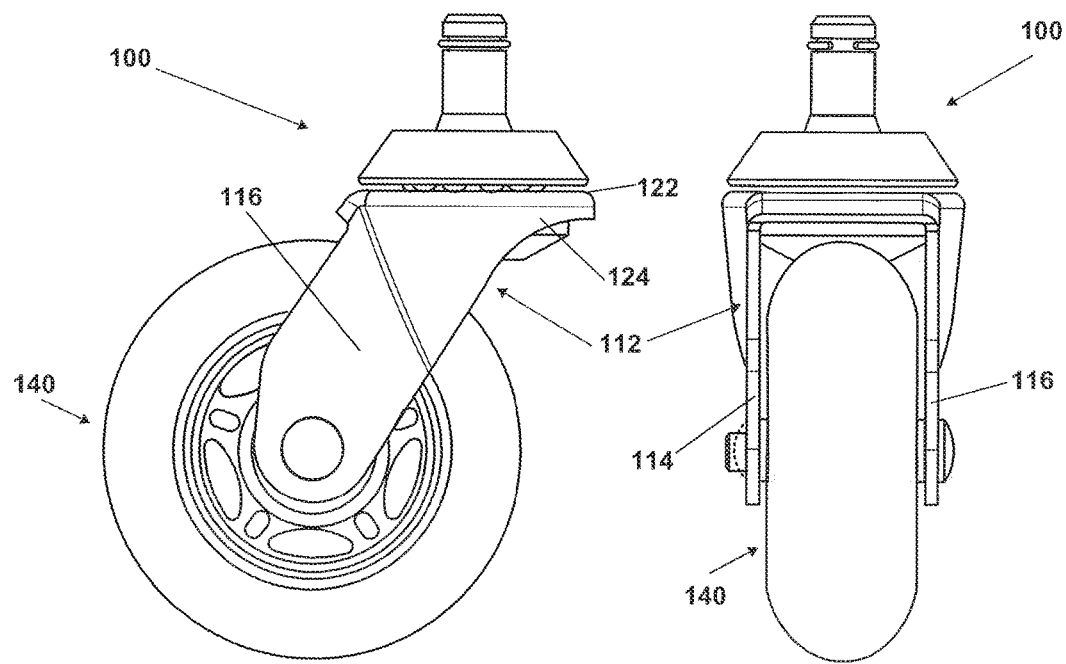
FIG. 8 is a side elevational view illustration of a caster system according to a second embodiment of the disclosed technology.
FIG. 9 is a front elevational view illustration of the caster system of FIG. 8.
Figure 10:
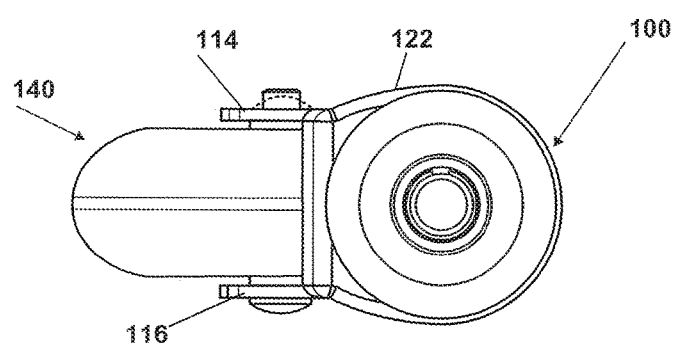
FIG. 10 is a top plan view illustration of the caster system of FIG. 8.

Reference is now made to FIG. 8, which is a side plan view illustration of a caster system 100 according to a second embodiment of the disclosed technology, to FIG. 9, which is a front plan view illustration of the caster system 100, and to FIG. 10, which is a top plan view illustration of the caster system 100.

Caster system 100 is similar to caster system 10 of FIGS. 1 to 7b, with like numbers representing like elements. Caster system 100 differs from caster system 10 in that caster system 100 excludes brake assembly 60 (FIG. 1). As such, housing portion 112 of caster system. 100 including first and second side walls 114 and 116, which do not include side extensions for connection of a brake assembly as shown in FIG. 1. Housing portion 112 further includes a generally circular upper wall 122, surrounded by a generally circumferential rim wall 124 and including a central through going bore 126, but does not include an extension for connection of a brake assembly as shown in FIG. 1.

Turning now to structural characteristics of rolling assembly 40, resilient exterior rim 46 is constructed as a thick layer of a resilient material disposed around inner disk 44. An exterior surface of exterior rim 46 is typically smooth. The exterior rim 46 may be formed of any suitable resilient material, such as polyurethane. Due to the resiliency of this the exterior rim 46, when a furniture article is moved on one or more caster systems 10/100, the supporting surface (e.g. a floor surface, or a floor covering such as a carpet), remains unharmed.

The caster system 10/100 further enables a user to freely move/roll the furniture article, while not being hindered by an uneven supporting surface or by small obstacles on the supporting surface such as wires, thresholds, and the like. Additionally, the resilient material of rim 46 enables the user to move the furniture article with less friction and resistance, comparable to prior art. Furthermore, when furniture is moved using one or more caster systems 10/100 as described herein, the caster system is capable of absorbing shocks while providing smooth motion of the furniture article. The absorbance of shocks is particularly important when moving sensitive items, such as musical instruments and medical machinery.

In some embodiments, exterior rim 46 may be colored or dyed, for example by addition of coloring agents thereto. In some such embodiments, the coloring agent may be a fluorescent dye or other substance providing a light-emitting effect or light reflecting effect, such that the exterior rim glows when in a dark environment. In such embodiments, the furniture article may be moved more easily in the dark, and injuries during moving of furniture items in the dark may be prevented.

In some embodiments, phosphorescent phosphor pigments that emit light in the visible spectrum are added to resin compositions used for creating the exterior rim 46. For example, the exterior rim 46 may be formed of transparent or translucent resins and the phosphorescent phosphor pigments may be added to such resins, in such embodiments, exterior rim 46 may exhibit a clear fluorescent color in a lighted environment, and in a dark environment may provide a long-lasting glow-in-the-dark luminescence having a color similar to that exhibited in a lighted environment.

In some embodiments, polymer-soluble fluorescent dyes may be added to the exterior rim 46, for example in combination with phosphorescent pigments, to provide a greater variety of colors visible in lighted and dark environments.

In some embodiments, the coloring agent is added to the exterior rim, or the resilient material, during manufacturing of the caster unit. For example, a phosphorescent compound adapted for glowing for a period following exposure to light energy may be added during the molding process of the exterior rim 46. In some such embodiments, the phosphorescent exterior rim 46 is adapted to receive illumination from external light sources and to provide a decaying glow therefrom. The phosphorescent exterior rim facilitates visibility of the associated furniture article especially when it is moved in darkness, thereby imparting safety as well as affording a degree of convenience to the user.

It is a particular feature of the structure of caster assembly 10/100 that the assembly may withstand a substantial load, for example supporting a furniture article having a weight in the range of 1 to 300 kg, without losing the mobility of the rotating elements. Naturally, a greater number of caster assemblies may support a greater weight. For example, 10 caster assemblies may support a greater weight than 3 or 4 caster assemblies.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention.

The invention claimed is:

1. A caster system, comprising:
    a housing portion including:
        first and second side walls defining an operational space therebetween; and
        an upper wall including a central bore;
    a rolling assembly disposed in said operational space, said rolling assembly being rotatable relative to said first and second side walls, and including:
        a hub;
        a rigid interior disk surrounding said hub; and
        an exterior rim formed of a resilient material having at least one coloring agent embedded therein; and
    a vertical connection assembly, including a shaft adapted to be fixed to a furniture article and to extend through said central bore in said upper wall,
    wherein said housing portion is rotatable about said shaft of said vertical connection assembly, and
    wherein said coloring agent is adapted to be luminescent or phosphorescent in a dark environment.

2. The caster system of claim 1, wherein said first and second side walls of said housing portion each includes a side extension having a side extension bore formed therein, and said housing portion further includes a first extension extending from said upper wall between said side extensions, said first extension being substantially flush with said upper wall.

3. The caster system of claim 2, further including a brake assembly comprising:
    a brake plate having a first end and a second end, said first end being fixedly attached to said first extension and said second end being disposed adjacent said rolling assembly; and
    a brake pedal disposed above said brake plate, and pivotally connected to said side extensions of said housing portion via said extension bores, said brake pedal being pivotable, relative to said housing portion, between a first position and a second position,
    wherein, when said brake pedal is in said first position, said brake pedal engages said brake plate while said brake plate is distant from said rolling assembly, such that said rolling assembly can rotate relative to said housing, and
    when said brake pedal is in said second position, said brake pedal pushes said brake plate toward said exterior rim, such that said brake plate engages said exterior rim of said rolling assembly and rotation of said rolling assembly relative to said housing is prevented.

4. The caster system of claim 3, wherein said brake pedal is adapted to be transitioned between said first position and said second position under force applied by the foot of an operator using the caster system.

5. The caster system of claim 1, wherein said vertical connection assembly further includes first and second bearing disposed, about said shaft and engaging respective upper and lower surfaces of said upper wall.

6. The caster system of claim 5, wherein at least one of said first and said second bearings comprises ball bearings.

7. The caster system of claim 1, wherein said resilient exterior rim comprises a resin composition including phosphorescent phosphor pigments as said coloring agent, such that exterior rim is adapted to exhibit a color in a lighted environment and to luminesce in said dark environment.

8. The caster system of claim 7, wherein said luminescence of said exterior rim has a color similar to said color exhibited in said lighted environment.

9. The caster system of claim 7, wherein said resilient exterior rim further includes at least one fluorescent dye as said coloring agent.

10. The caster system of claim 1, wherein said coloring agent is adapted to receive illumination from at least one external light source and to provide a decaying glow from said illumination.

11. The caster system of claim 1, wherein said exterior rim is smooth and is adapted to maintain a supporting surface, on which said rolling assembly is rolled, unharmed.

12. The caster system of claim 1, wherein said resilient material is selected such that said rolling assembly is adapted to roll over a small obstacle having a height of at most 1 cm without hindrance to movement of said rolling assembly.

13. The caster system of claim 1, wherein said resilient material is selected so as to absorbs shocks to said rolling assembly during rotation thereof relative to said housing portion.

14. A movable furniture article, comprising:
a furniture article body; and
a plurality of caster systems according to claim 1, wherein said shaft of each of said plurality of caster systems is fixedly attached to said furniture article body,
wherein said plurality of caster systems are adapted to enable an operator to move said furniture article, and
wherein said exterior rims of said plurality of caster systems are adapted to luminesce or fluoresce when the furniture article is in a dark environment, thus enabling the operator to move the furniture article safely in the dark.

\* \* \* \* \*